United States Patent
McDermott (10) Patent No.: US 9,457,916 B2
(45) Date of Patent: Oct. 4, 2016

(54) VISUAL AID FOR LANDING HELICOPTERS

(76) Inventor: Kevin McDermott, Rockledge, FL (US)

( * ) Notice: Subject to any disclaimer, the term of this patent is extended or adjusted under 35 U.S.C. 154(b) by 0 days.

(21) Appl. No.: 13/311,602

(22) Filed: Dec. 6, 2011

(65) Prior Publication Data

US 2013/0141255 A1   Jun. 6, 2013

(51) Int. Cl.
B64F 1/18   (2006.01)

(52) U.S. Cl.
CPC ........................................ B64F 1/18 (2013.01)

(58) Field of Classification Search
CPC ........................................................ B64F 1/18
USPC ................ 340/945–950, 953–956, 958, 972,
340/981–983, 691.1–693.1, 693.3–693.5,
340/693.7; 244/114 R, 116; 362/281–283,
362/285, 287; 701/120
See application file for complete search history.

(56) References Cited

U.S. PATENT DOCUMENTS

| | | | | |
|---|---|---|---|---|
| 3,886,347 A | * | 5/1975 | Dorman ..................... | 362/311.09 |
| 4,498,733 A | * | 2/1985 | Flanagan ................... | 359/531 |
| 4,779,942 A | * | 10/1988 | Verney ...................... | 250/340 |
| 5,067,669 A | * | 11/1991 | Van Horn et al. ......... | 244/114 R |
| 5,416,636 A | * | 5/1995 | Bennett ..................... | 359/529 |
| 5,888,016 A | * | 3/1999 | Ahn .......................... | 404/10 |
| 6,069,557 A | * | 5/2000 | Anglin et al. ............. | 340/321 |
| 6,758,586 B1 | * | 7/2004 | Wilhem et al. ............ | 362/471 |
| 6,808,291 B1 | * | 10/2004 | Aylward et al. ........... | 362/205 |
| 6,906,464 B2 | * | 6/2005 | Bryant ....................... | 313/635 |
| 7,224,327 B2 | * | 5/2007 | Wammes .................... | 345/8 |
| 7,391,340 B2 | * | 6/2008 | Malhomme ................. | 340/947 |
| 7,538,688 B1 | * | 5/2009 | Stewart ...................... | 340/908 |
| 7,997,753 B2 | * | 8/2011 | Walesa et al. .............. | 362/191 |
| 2002/0054492 A1 | * | 5/2002 | Gluck ........................ | B64F 1/20 362/153.1 |
| 2004/0113817 A1 | * | 6/2004 | Novak et al. .............. | 340/983 |
| 2005/0052869 A1 | * | 3/2005 | Brenner et al. ............ | 362/293 |
| 2006/0016383 A1 | * | 1/2006 | Flamingo et al. .......... | 116/63 C |
| 2006/0170568 A1 | * | 8/2006 | Malhomme ................. | 340/981 |
| 2007/0113774 A1 | * | 5/2007 | Kuo .......................... | 116/63 C |
| 2007/0241255 A1 | * | 10/2007 | Dvoracek .................. | 248/346.01 |
| 2009/0146582 A1 | * | 6/2009 | Whitehead ................. | 315/294 |

(Continued)

OTHER PUBLICATIONS

Tektite brochure/poster; 2 pages, downloaded from: http://www.tektite.com/images/ELZ%20Poster.pdf, document created Feb. 19, 2010, last modified Feb. 19, 2010, "Now-Portable Strobes Whenever You Need Them" Teltite Industries, 309 North Clinton Ave. Trenton, NJ 08638.*

(Continued)

*Primary Examiner* — Benjamin C Lee
*Assistant Examiner* — Stephen Burgdorf
(74) *Attorney, Agent, or Firm* — Hauptman Ham, LLP (57) ABSTRACT

A visual aid for landing helicopters includes a plurality of weighted bases and a plurality of lights designed such that they can identify a helicopter landing zone during nighttime or during the bright sunlight. The components of the visual aid are designed to provide rapid identification of the landing zone, whether the pilot of the helicopter is flying with his unaided eye or with typical night vision goggles. The weighted bases have a large surface area and are coated with a highly visible fluorescent paint. The lights are designed to emit light having wavelengths, intensities and beam patterns which will not overwhelm night vision goggles but which will be acceptably visible to pilots flying without night vision goggles. The lights and weighted bases are color-coded such that they identify both the perimeter of the landing zone and the wind direction within the landing zone.

32 Claims, 6 Drawing Sheets

(56) References Cited

U.S. PATENT DOCUMENTS

| | | |
|---|---|---|
| 2011/0137757 A1* | 6/2011 | Paolini et al. ............... 705/27.1 |
| 2011/0199769 A1* | 8/2011 | Bretschneider et al. 362/249.02 |
| 2013/0021172 A1* | 1/2013 | Boedeker ...................... 340/953 |

OTHER PUBLICATIONS

VizCon Product Catalog 2009-2010; 40 pages, downloaded from http://ebookbrowse.com/vizcon-catalog-2009-pdf-d14937516, copyright 2008, Visibility Connection LLC, 4249 E. Andrea Dr. Cave Creek, AZ 85331.*

Tektite Product Catalog; 17 pages; "Demanding Environments . . . Rugged Gear", copyright 2005, Tektite Industries Inc., 309 North Clinton Avenue, Trenton, NJ 08638.*

Alliance Fire and Rescue PowerPoint Presentation: 13 pages, downloaded from http://alliancefireandrescue.com/online_literature/E-FlarePowerpoint_May2011.pdf, created and last modified May 17, 2011, "eflare safety in a flash, be seen be safe", Alliance Fire and Rescue, Inc., P.O. Box 426, Guilderland Center, NY 12085.*

Tektite Product Specification Chart , 2 pages, Jan. 2008, Eflare Corporation Pty Ltd, Level 1, 222 St. Kilda Road, St. Kilda, Victoria, 3182 Australia.*

Alliance Fire and Rescue Brochure: 4 pages, downloaded from http://alliancefireandrescue.com/online_literature/Eflare%20Flyer%20June06.pdf, created and last modified May 17, 2011, "eflare Warning Beacons", Jun. 2006, Alliance Fire and Rescue, Inc., P.O. Box 426, Guilderland Center, NY 12085.*

Website: http://www.etipinc.com/landing-zone-kit.asp 3 pages dated May 30, 2011.

Website: http://www.aircraftspruce.com/catalog/elpages/tektitelandinghelicopter.php 2 pages dated May 30, 2011.

Website: http://www.rescuetech1.com/eflare500helicopterlzkitnew.aspx 2 pages dated May 30, 2011.

Website: http://www.ehow.com/how_8526360_set-military-landing-zone-kit.html 2 pages dated Jun. 12, 2011.

Magazine: Aviation, Space, and Environmental Medicine. vol. 74, No. 1 Dated Jan. 2003, "Civilian Use of Night Vision Goggles." pp. 79-84. Guillermo Salazar, Leonard Temme, and J Charles Antonio.

\* cited by examiner

VISUAL AID FOR LANDING HELICOPTERS

BACKGROUND OF THE INVENTION

1. Field of Invention

The field of the invention relates to a landing zone (LZ) kit used to provide a temporary landing zone for helicopters. In order for this kit to do its job properly it must indicate to the pilot the location of the landing zone during both daytime and nighttime conditions. In addition, during the landing process the helicopter generates substantial wind. Therefore the deployed components of the landing zone kit must resist being displaced from their proper locations by the rotor wash of the helicopter. In order to minimize displacement it is important that the components resist rolling on the ground or becoming airborne and striking the helicopters blades.

During nighttime landings pilots often employ night vision goggles to aid them during the landing process. Therefore the landing zone kit must be designed to avoid overwhelming or blinding the night vision goggles being employed. The landing zone kit will overwhelm night vision goggles if the landing zone lights emit excessive amounts of visible, infrared, or infrared combined with visible radiation towards pilots flying with night vision goggles. Excessive amounts of visible light directed towards pilots flying with the unaided eye can also blind the pilot thereby creating a serious hazard. Landing zone kits that employ incandescent or xenon strobe lamps can present problems for the pilot as these traditional light sources commonly simultaneously emit large amounts of infrared light whenever they are emitting visible light. This combination of emitted energy can easily overwhelm night vision goggles.

The landing zone kit must include lights which are bright enough to be visible from a substantial distance so the pilot can locate the landing zone. However, as the aircraft approaches the landing zone the lights must reduce the intensity directed towards the pilot so that they will not blind the pilot's unaided eye or overwhelm his night vision goggles. This potential problem can be avoided by adding an optic or lens to each light to concentrate the light about the horizontal thereby creating a light beam directed about or slightly above the horizontal. The typical light beam has an angular beamwidth of approximately ten degrees which is intense enough to be visible by the pilot from a substantial distance as he approaches the landing zone. However, as the helicopter becomes close to the landing zone the pilot's line of sight is angled well above the horizontal and therefore out of the high intensity beamwidth created by the lens. At this angular position—out of the concentrated light beam—the intensity of the light impinging upon the pilot is substantially reduced permitting the pilot to complete the landing without excessive intensity.

It is common for helicopters to have powerful flood lights. It is therefore desirable to use the helicopter flood lights as an aid to assist the pilot to precisely locate the landing zone as the helicopter hovers over it.

It is difficult for the battery-powered lights of a typical landing zone kit to be powerful enough to provide adequate visibility during daytime landing operations. Therefore it is problematic for commercially offered kits to function adequately during daytime or during bright sunlight landings.

Commercial landing zone kits do not provide a reflectorized weighted base backup system which assures the pilot an adequately identified landing zone in the event that one or more of the lights in the kit fail.

Commercial landing zone kits must be lightweight and compact as they are frequently stored in small compartments on emergency vehicles. It is problematic to create a portable landing zone kit that is compact and lightweight yet which solves the problems related to landing zone identification including: tall grass obstruction, lights that are visible at great distances, daytime visibility and stability against rotor wash.

2. Prior Art

It is common for medical evacuation helicopters to be required to land at accident scenes so that they can transport injured people to proper medical facilities. First responders are tasked with the responsibility of locating and identifying a proper landing zone for these helicopters. It is critical that the pilot of an arriving helicopter have the landing zone marked such that he can easily and quickly locate both the perimeter of the landing zone and the wind direction within the landing zone.

Prior art includes a variety of landing zone kits for the problem of setting up temporary landing zones for helicopters. A first prior art kit solution (see web page www.etip-inc.com) employs five xenon strobe lights. Four of the strobe lights (perimeter lights) are placed at the corners of the landing zone in a square pattern to indicate the proper landing location for the helicopter. The fifth strobe light is placed midway between two perimeter lights to indicate the wind direction for the helicopter pilot. This method of delineating the landing zone is commonly known. The xenon strobe lights are constantly flashing. This flashing of five lights can be confusing to the pilot. Furthermore the duration of the flash of a xenon strobe is extremely short making it difficult from a depth perception perspective to accurately locate the corners of the landing zone. Five flashing lights each having an extremely short flash duration can confuse a pilot or at the very least make it difficult for the pilot to precisely and quickly locate the landing zone. This first prior art kit often also includes several sets of five lenses each. Each set of lenses is of a different color permitting the user to change the color of the entire five lights as desired. For example, it is common for this kit to include five red lenses, five amber lenses and five white lenses. Since the xenon strobe light produces a broad spectrum of emitted light each color lens permits that color of light to pass. Sometimes a group of infrared lenses is also included. The strobe lights emit both visible and infrared energy. The infrared lenses block the visible light transmitting only the infrared light which is visible only to pilots using night vision goggles. The lights in this first prior art kit have a magnet at their underside which attaches to a steel weight or base to provide stability of the assembly during rotor wash. The steel weights are small in size having a surface area of approximately 16 $in^2$. In addition, the weights are not painted with a bold or fluorescent color and when deployed they are substantially covered by the lights. The small projected area of these weights—when viewed from above—does not provide useful visibility during daytime operations. The individual lights are powered by two AA batteries each with their axis parallel to the horizontal. This battery disposition creates a low profile for the lights which is approximately 1.5 inches tall. This design offers little wind resistance because of its low profile and small size. This reduces the possibility of their being shifted by rotor wash winds and it makes the landing zone kit beneficially compact. Unfortunately the low profile of the lights substantially reduces their visibility if they are surrounded by tall grass.

This first prior art kit creates a number of difficulties for pilots. The xenon strobe lights emit light covering a wide range of wavelengths including infrared. This causes a problem for pilots flying with night vision goggles which respond to both visible and infrared light. The goggles can be blinded (overwhelmed) by the combined energy of the multi-wavelength light emitted from the strobe light. In addition the strobe lights only flash. The flashing of five lights within the landing zone can both blind and confuse the pilot. It is noteworthy that the supplier of this kit supplies five lenses of each color and does not suggest mixing colors. Since this first kit illuminates all five lights with a single color it opens the door to pilot error as the pilot may confuse the wind direction light with the perimeter lights.

A second prior art kit (see webpage www.aircraftspruce.com) is similar to the first prior art kit except in addition to the five flashing beam light modules it optionally includes five steady beam light modules. This option permits the user to change all of the xenon strobe landing zone lights into steady beam incandescent lights by changing the light modules. This steady light beam option eliminates the problem of several flashing lights confusing the pilot. However it still does not permit the pilot to distinguish between the perimeter lights and the wind direction light. In addition if the five steady beam light modules are employed the pilot can fail to locate the landing zone which now can be confused with other steady lights in the area. This second prior art kit employs two C cell batteries axially aligned along a vertical. The included light is 9.5 inches tall and is permanently attached to a round base which is 6 inches in diameter. The light and the base are orange in color and the combination weighs 3.5 pounds. The 6 inch diameter base has a circular periphery and a projected area of approximately thirty square inches when viewed from directly above by a helicopter pilot. Pilots searching for a landing zone must locate it from a distance and the projected area of the base is substantially reduced as the helicopter approaches the landing zone and the angle of viewing changes. An approaching pilot may view the base at a substantial angle of divergence from the vertical making the base appear substantially smaller than it actually is. A base having thirty square inches is too small of a target for a pilot searching for a landing zone. Since the lights and bases are permanently connected there is no way to deploy the bases separately for daytime landings. The bases are not large enough to provide reasonable visibility to an approaching pilot and not coated with fluorescent paint which would be employed if bright sunlight visibility were an objective. There is no indication that the weighted bases were intended for daytime visibility. In this design the light is permanently attached to the base. Therefore if rotor wash pushes the light horizontally the base will be rotated upward and can be caught by the wind. This is undesirable as the base/light assembly can be displaced. Due to its round perimeter the base can roll to an undesirable location.

The light is tall and therefore beneficially emits its beam of light above tall grass. It employs C cell batteries which have a large diameter relative to AA cells. The large diameter C cells result in a light having a large body diameter and therefore a large horizontally projected area. This design is not a desirable result as it increases the wind resistance and positions the center of gravity of the design substantially above ground level decreasing the stability of the assembly. The large horizontally projected area and tall light combine to encourage the rotor wash winds to develop forces and torques adequate to displace or overturn the light assembly. Additional weight can be added to correct the stability problem but additional weight is not desirable when transporting the LZ kit.

A third prior art kit (see www.rescuetech1.com) provides five lights each of which incorporate LED bulbs. Each light can—by rotating a bezel—emit either a flashing or steady beam. The housings of the lights are fluorescent yellow and can include reflective tape on their body. The lights are held upright by means of a black rubber base. Lens colors are offered in sets of four orange and one blue or four amber and one blue. This third prior art kit uses the color of the emitted light to differentiate between the four perimeter lights and the wind direction light. It also employs LED lamps. Lights that employ LED lamps normally require that the LED lamps be changed in order to change the color of the emitted light because LED lamps emit light only within a very narrow nanometer (nm) bandwidth, LED lamps normally do not emit significant amounts of infrared light if they are emitting visible light. Hence it is usually inefficient and sometimes impossible to change the color of the emitted light from an LED light source by changing a lens or filter. Therefore, in this prior art design the color of emitted light is mostly determined by the LED lamp chosen for the product. Color lenses are employed only for very minor adjustments in color or as indicators of the color of the light which will be emitted by the LED lamps.

This design does beneficially permit pilots flying with the unaided eye to locate both the perimeter of the landing zone and the wind direction. However pilots flying with some night vision goggles can have a serious problem as some goggles attenuate light at the wavelengths represented by blue LED lights. Pilots using some filtered night vision goggles will have trouble seeing the blue LED wind direction lights as the blue wavelengths are blocked and the LED lamps emit very little infrared light. This is problematic as knowing wind direction is critical to a safe landing and takeoff.

A fourth prior art landing zone design used by the military can be found on website www.ehow.com/how_8526360_set-military-landing-zone-kit.html. The military employs fabric landing zone markers which are approximately 3'×3'. The fabric is coated with a fluorescent orange coating. In addition it is coated with a reflective coating. The fabric is secured to the ground by placing locally obtained rocks around its periphery. The military landing zone kit also employs glow sticks known as Chemlights™ in place of the battery-powered lights used in commercial kits. Glow sticks are chemically activated lights which—once activated—emit light in all directions. The emitted light is a steady beam of a narrow bandwidth similar to an LED light source. It is not very intense as the light is not concentrated by a lens. The military is known to have its own requirements, so what works for them, may not be acceptable for civilian pilots.

For example, civilians may not have available rocks to prevent the fabric from being blown away. Also the lights are not bright enough for the civilian world in which the lights marking the landing zone have to compete with nearby civilian lighting. Finally, although the fabric is coated with fluorescent orange and reflective paints it does not stand out or provide the visibility of a smooth, flat fluorescent orange or reflective surface because the wrinkled fabric reduces the visibility of both the fluorescent orange and reflective paints. In order to avoid being easily displaced by rotor wash the fabric markers are of a heavy material.

Therefore a group of these markers—as would be required in a landing zone kit—would be unacceptably bulky when considered for civilian use.

3. Objects and Advantages

The objects and advantages of the present invention are to provide a landing zone kit that achieves the following:

It is—when deployed—visible both to pilots with class A night vision goggles and pilots flying with the unaided eye (without night vision goggles), yet it does not overwhelm the night vision goggles with excessive energy as it provides visible light sufficient to be seen with the unaided eye.

It includes weighted bases having sufficient surface area and coloring to make them visible to pilots attempting to locate the landing zone in bright sunlight, thereby permitting the landing zone to be identified during daytime without lights.

It includes weighted bases that are heavy enough to prevent displacement during rotor wash even considering that these bases have a projected surface area large enough to ensure daytime disability.

It includes lights and weighted bases which can be used separately or as an assembly.

It includes AA batteries axially aligned along a vertical permitting a light housing having a nominal diameter which is minimized, therefore minimizing the forces applied to the light assembly due to rotor wash winds. Minimizing the forces due to rotor wash makes the light assembly more stable permitting a design of reduced weight.

It includes three AA batteries having minimal weight axially aligned along the vertical in place of the relatively heavy C and D cells used by prior art. The light component of the present invention can therefore be substantially lighter in weight then prior art designs having their batteries axially aligned along the vertical Consequently, for a light/base assembly of limited weight the base of the present invention can weigh more than the base component of prior art. Having the light component of less weight than the light component of prior art and a base component of greater weight than the base component of prior art results in the more stable (wind resistant) lighting assembly of the current invention.

It employs AA batteries, which unlike C or D cell batteries are readily available as alkaline, rechargeable or lithium batteries. By employing AA batteries the present design permits the choice of AA lithium batteries which are substantially lighter in weight than the alkaline or rechargeable batteries. The reduced weight option is especially important for designs which axially position the batteries because axially positioned designs tend to have their center of gravity high making them unstable. Designs employing C and D cell batteries cannot lower their center of gravity by switching to readily available lithium batteries.

It includes lights that have emerging light beams of the wavelengths and beam patterns necessary to avoid overwhelming class A night vision goggles when pilots are landing with night vision goggles yet which assure nighttime and dusk visibility for those pilots landing with the unaided eye.

It includes weighted bases that have a reflectorized smooth surface projected surface area that will efficiently reflect the light from the helicopters floodlight back to the pilot, thereby aiding the pilot in precisely locating the landing zone. In addition the bases act as a failsafe identifier of the landing zone in the event of landing zone light failure. The smooth surface of the reflectorized area makes the reflecting process more efficient, and therefore permits a reduction in the size of the base and the reflective zone over the prior art reflective fabric. Reducing the size of the weighted base is beneficial as it makes the entire kit more compact and lighter in weight.

It includes weighted bases and landing zone lights, both of which are color-coded and color coordinated to distinctly identify both the perimeter and the wind direction. It further coordinates the perimeter lights with the perimeter weighted bases by coloring them with a first color group. Similarly it coordinates the wind direction light with the wind direction weighted base by coloring them with a second color group. This design feature permits pilots to identify both the wind direction and the perimeter during daylight, dusk and evening.

The present invention permits pilots flying with night vision goggles to identify and separate wind direction and perimeter lighting. Pilots flying with night vision goggles cannot differentiate between colors. Therefore, using colors to separate wind direction from perimeter lights will not function for pilots flying with night vision goggles. The present invention uses different light modes to separate wind direction from perimeter lighting. Typically, the wind direction light is pulsing or flashing and the perimeter lights are steady. Therefore, even when flying with night vision goggles and even though the pilot cannot differentiate colors he can identify the wind direction as the pulsing light. The preferred embodiment of this invention employs four steady mode perimeter lights and one flashing mode wind direction light. Although the modes could be switched between perimeter and wind direction lighting the preferred embodiment is selected so that the pilot will not be confused by a plurality of pulsing lights. Prior art has offered five landing zone lights permitting the user the option of making all of the lights either steady or flashing. This is done because even though five flashing lights can be distracting and confusing some pilots prefer flashing lights in city areas to differentiate the landing zone from steady beam surrounding lighting. Other pilots especially in rural areas prefer five lights emitting steady light which is not distracting. In having a single light flashing the present invention offers a landing zone kit which is identifiable in both in rural and city areas and which also separates wind direction from perimeter lighting for pilots with night vision goggles.

It includes rectangular weighted bases and a rectangular carrying case which cooperate to reduce the space required to store the landing zone kit. First responders such as fire and police are required to carry a substantial amount of equipment in their vehicles. Space is valuable and a landing zone kit which is too bulky or heavy will not be acceptable. Rectangular weighted bases fit compactly in rectangular carrying cases effectively reducing the storage space required for the LZ kit,

DRAWINGS

Figures

| DRAWINGS - Reference Letters | | DRAWINGS - Reference Numerals | |
|---|---|---|---|
| A | Axis | 1 | 2 dome |
| AR | Red Light Assembly | 3A housing thread | 3 housing |
|  |  | 4 light reflective tape | 5 battery cap |
| AY | Yellow Light Assembly | 6 | 5A battery cap thread |
|  |  | 7 carrying hole | 8A base reflective tape |
| B1 | Battery 1 | 8B base reflective tape | 9 depression |
| B2 | Battery 2 | 10 bumper | 11 magnet |
| B3 | Battery 3 | 12 spring | 13 |
| BR | Red Base | 14 lens | 15 red LED lamp |
| BY | Yellow Base | 16 | 17 landing zone indicator |
| C | Circuit | 18 | 19 |
| CA | Carrying Case | 20 landing zone kit |  |
| D | Diameter |  |  |
| FS | Foam Side |  |  |
| FT | Foam Top |  |  |
| H | Height |  |  |
| HR | Horizontal |  |  |
| LB | Light Beam |  |  |
| LR | Red Light |  |  |
| LY | Yellow Light |  |  |
| LZ | Landing Zone |  |  |
| RD | Road |  |  |
| V | Vertical |  |  |
| W | Width |  |  |

OPERATIONAL DESCRIPTION OF THE PREFERRED EMBODIMENT FIGS. 1-12

Figure 1:
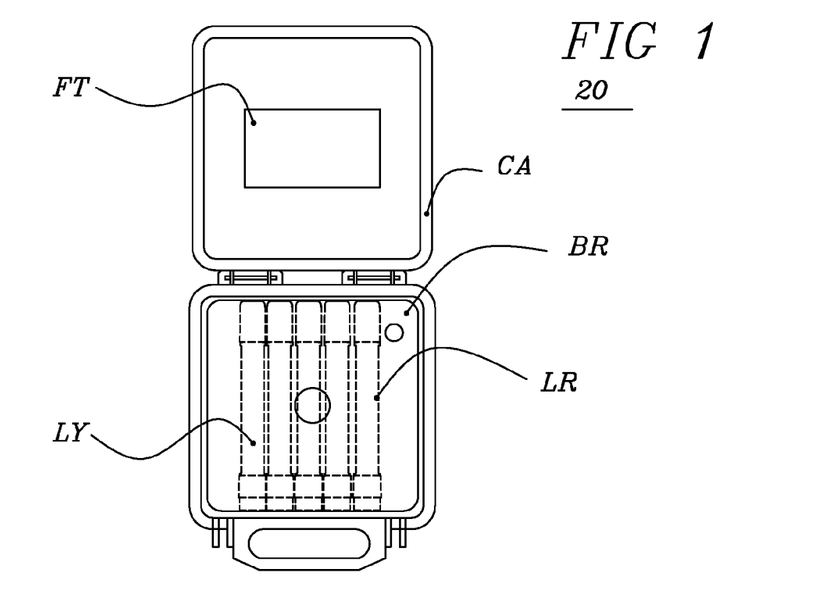
FIG. 1 is a top view of landing zone kit 20

FIG. 1 is a top view of landing zone kit 20 the preferred embodiment of this invention, Landing zone kit 20 is a visual aid for landing helicopters. Landing zone kit 20 includes four red bases BR, four red lights LR, one yellow base BY and one yellow light LY all packaged in carrying case CA. Carrying case CA is a typical commercially available rectangular or possibly square hinged heavy-duty carrying case. It is sized to secure and provide compact storage for the components of landing zone kit 20.

Figure 2:
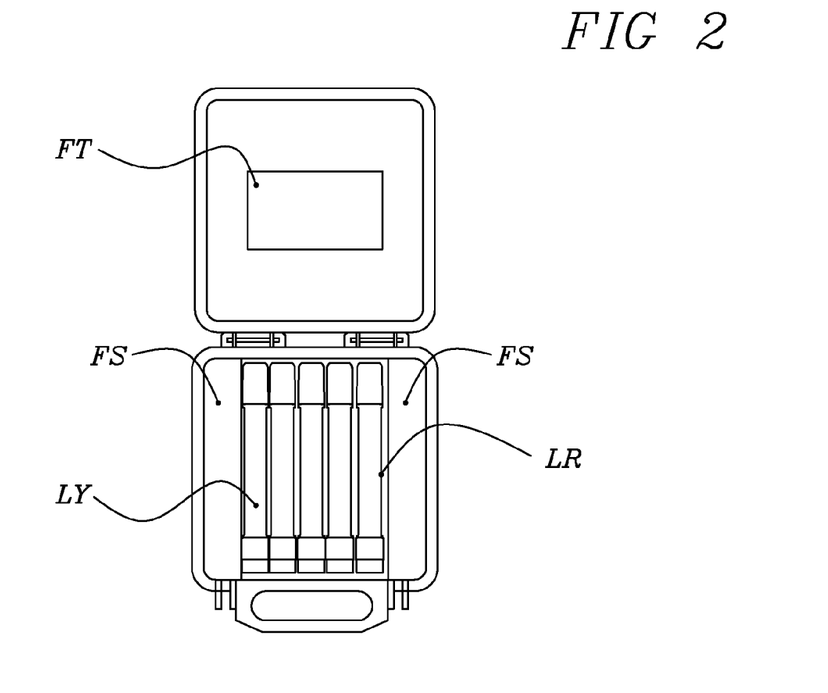
FIG. 2 is landing zone kit 20 of FIG. 1 with the weighted bases removed

FIG. 2 is similar to FIG. 1 except the weighted bases have been removed. Looking at FIG. 2 the five lights are positioned at the bottom of the carrying case with foam side FS on each side of the lights added to prevent shifting. Foam side FS is minimized to minimize the size of carrying case CA. When packaging the kit the five weighted bases are placed on top of the five lights. Foam top FT is glued to the inside top of carrying case CA to prevent movement of the contents as the case is closed.

Figure 3:
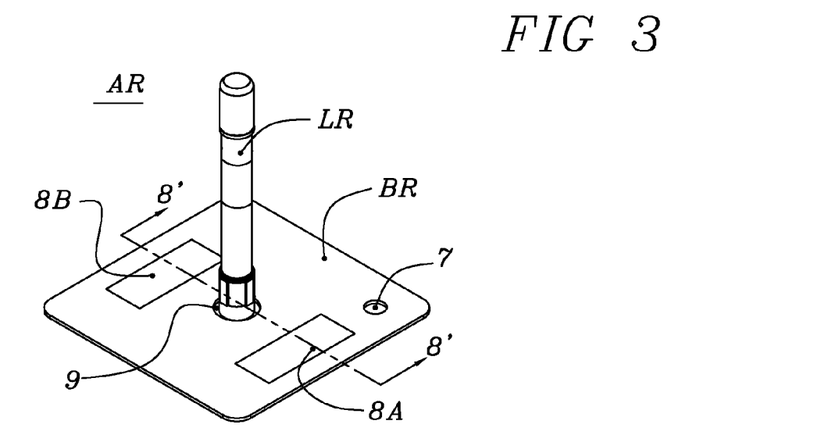
FIG. 3 is a perspective view of light assembly AR removed from landing zone kit 20

FIG. 3 is a perspective view of red light assembly AR removed from landing zone kit 20. Red light assembly AR includes red light LR, which is magnetically attached to red base BR and sits in depression 9. Red light LR is moveably attachable to and related to red base BR. Red base BR includes depression 9, base reflective tape 8B and base reflective tape 8A.

Figure 4:
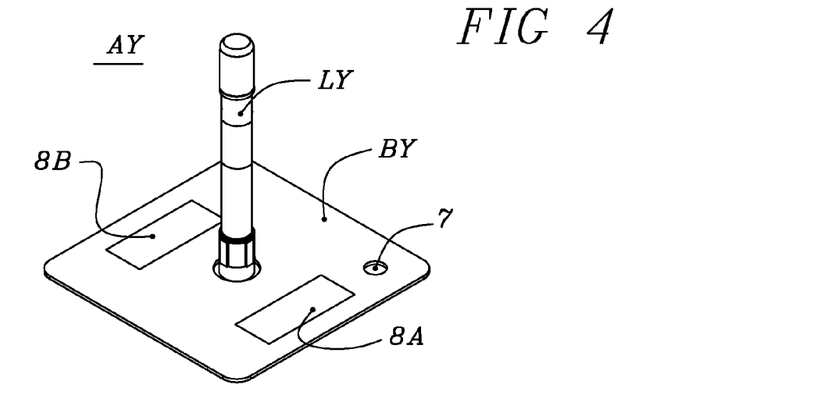
FIG. 4 is a perspective view of light assembly AY removed from landing zone kit 20

FIG. 4 is similar to FIG. 3, except FIG. 4 includes yellow light assembly AY, which includes yellow light LY and yellow base BY.

Figure 5:
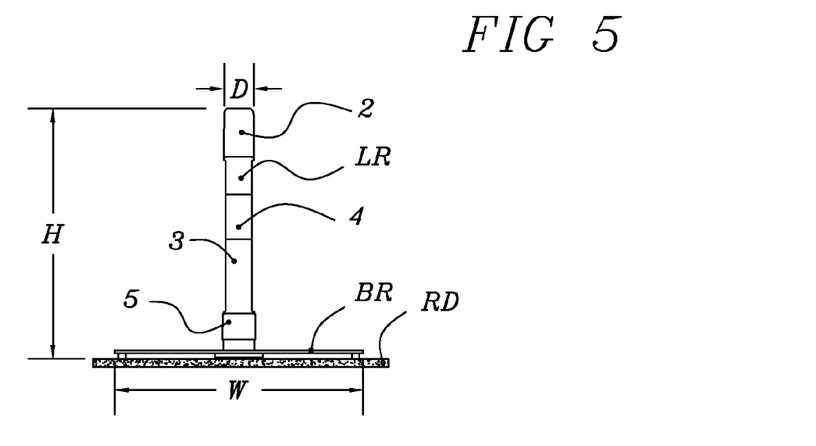
FIG. 5 is a side view of FIG. 3

FIG. 5 is a side view of FIG. 3 and includes red light LR having dome 2, housing 3 and battery cap 5. Red light LR has light reflective tape 4 comprising a reflective surface of at least one square inch wrapped around it. Reflective tape 4 is wrapped around the circumference of red light LR so that reflective surface is visible from all angles of approach.

Figure 6:
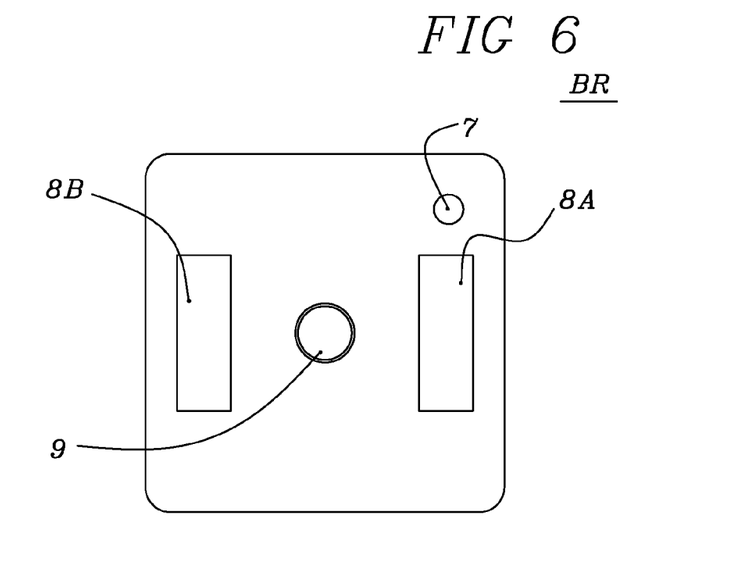
FIG. 6 is a top view of red base BR removed from FIG. 3

FIG. 6 is a top view of red base BR removed from FIG. 3. Red base BR is a 9 inch by 9 inch by ⅜ inch high rectangular steel plate weighing approximately 3 pounds. The steel plate includes a magnetic element (iron) and therefore attaches to a magnet. In order to minimize storage space is desirable that the height of the base be less than ½ of an inch. Red base BR is painted with a bold color paint such as a bright red/orange. Optionally red base BR can be painted with a fluorescent red/orange or red color. Using a fluorescent color will provide a superior product relative to bright orange in that it will be more visible when it is most needed during the bright sunlight of daytime. Typically, all four red bases are painted with a common bold or fluorescent color. However fluorescent paints are more expensive and therefore some users may be willing to settle for a bold color such as bright orange or yellow. Red base BR includes depression 9 for positioning red light LR. A rope or a person's finger can pass through aperture or carrying hole 7 to assist in carrying or transporting red base BR. Carrying hole 7 is indicative of one choice of a carrying element of the design of red base BR. There are numerous alternate carrying element options including straps and hooks which could be employed.

Figure 7:
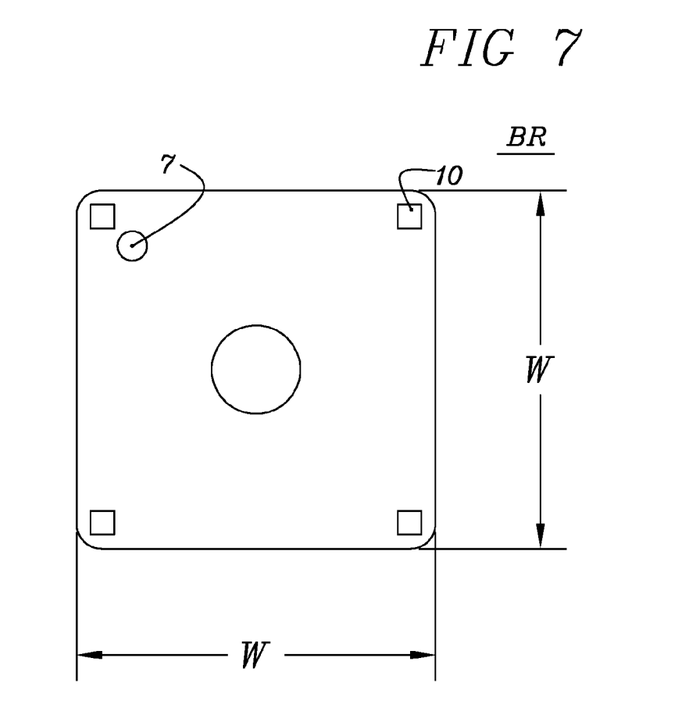
FIG. 7 a bottom view of red base BR removed from FIG. 3

FIG. 7 is a bottom view of red base BR shown in FIG. 6 and discloses four rubber bumpers 10 glued to the corners of the bottom of red base BR permitting it to stand evenly on rough roadway RD and also avoid depression 9 from hitting the roadway causing unacceptable rocking of red base BR.

Figure 8:
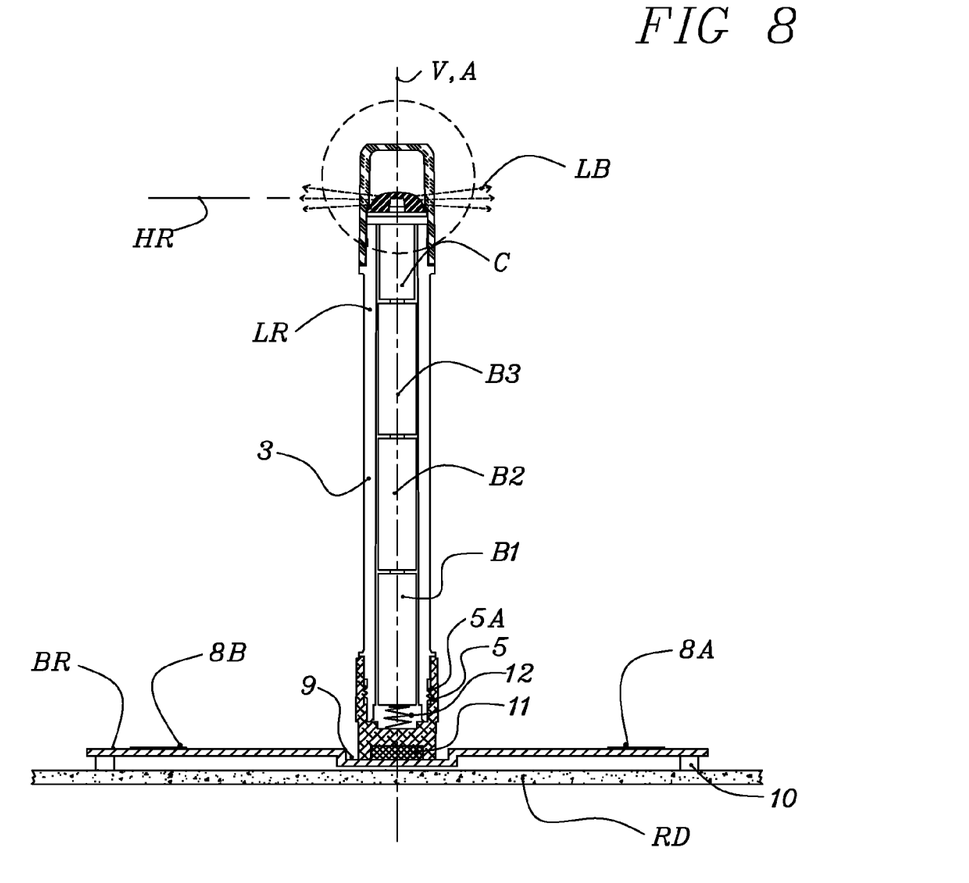
FIG. 8 is a sectional view across 88' of FIG. 3
Figure 9:
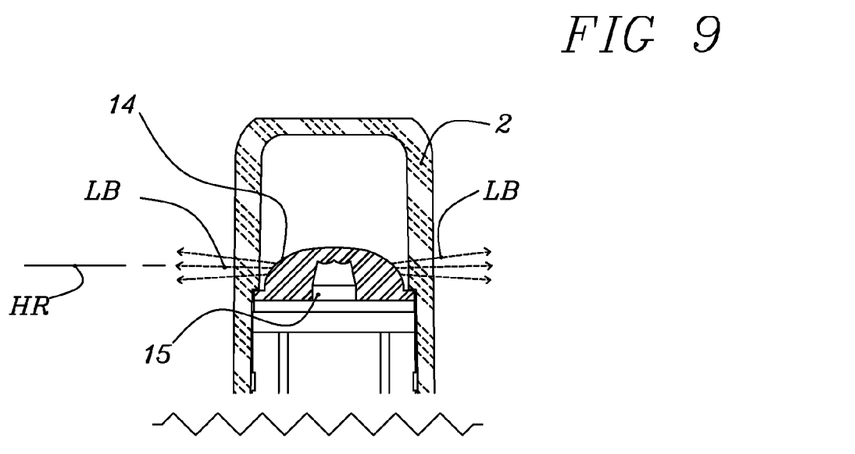
FIG. 9 is an exploded view of the top of FIG. 8

FIG. 8 is a cross-sectional view of red light assembly AR, which includes red light LR magnetically attached to steel red base BR. Red light LR consists of housing 3 with clear plastic dome 2 at the top and battery cap 5 at the bottom. Red light LR measures a nominal housing diameter under 1.125 inches and is approximately 9 inches tall. It is powered by three industry standard AA size alkaline batteries axially disposed along common axis A such that when red light LR is in its deployed position supported by red base BR on roadway RD as shown in FIG. 8 common axis A is coincident with vertical V. Red light LR has magnet 11 glued in battery cap 5 at its base and when placed in depression 9 attaches to red base BR. If rotor wash pushes red light LR it will tend to slide along red base BR however, because it is sitting in depression 9 it will only slide for a short distance eventually striking the edge of depression 9 and stopping. Red light LR is temporarily attached to red base BR forming red light assembly AR permitting landing zone kit 20 be used at night with light assemblies including both lights and weighted bases. Landing zone kit 20 can also be used in the daytime with the highly visible weighted bases alone saving effort and critical time during daytime landings. Red light LR in being magnetically attached to red base BR with magnet 11 makes it easy to attach it in the dark and easy to separate from red base BR for storage. The lights provided in landing zone kit 20 can—for some landing zones—be deployed without the weighted bases as they are tall enough to have their lower portion battery cap 5 partially buried in sand or loose dirt.

Red light LR in being powered by AA batteries is not only substantially smaller in nominal diameter, but substantially lighter in weight than prior art landing zone LZ lights, which employ C or D cell batteries. This, for a light plus base assembly of limited specification weight, permits red base BR to be heavier than prior art bases. The current invention in having a higher proportion of the light assembly weight located in its base disposed lower to the ground is an improvement in stability over prior art which positions heavy C cell batteries well above the ground in an effort to establish height.

FIG. 9 is an exploded view of the top or dome 2 portion of FIG. 8 showing the LED light source represented by red LED lamp 15 sending its emitted light through lens 14, where it is collected and projected into light beam LB directed approximately along horizontal HR or tilted slightly upward. In either case, the beamwidth is wide enough such that a reasonable portion of the light is angled upwards towards an approaching helicopter.

Figure 10:
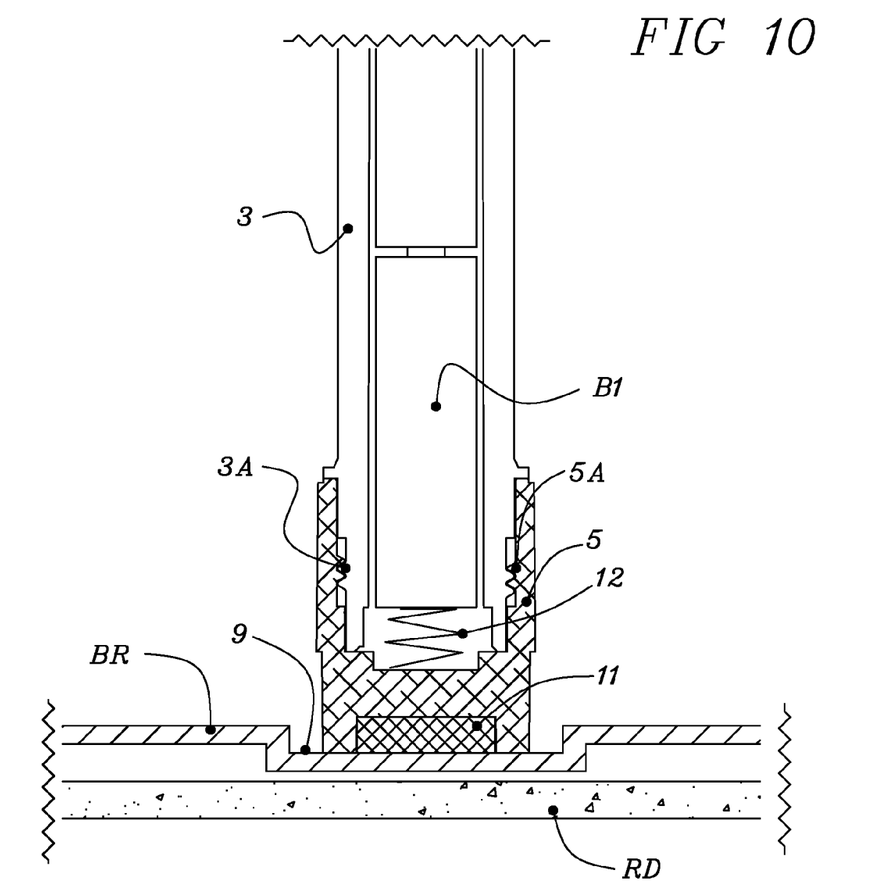
FIG. 10 is an exploded view of the bottom of FIG. 8

FIG. 10 is an exploded view of the bottom or battery cap 5 portion of FIG. 8. FIG. 10 shows battery cap 5 having magnet 11 glued into its base and spring 12 at its interior contacting battery 1 B1.

Battery cap 5 is attached to housing 3 by means of housing thread 3A on housing 3 and battery cap thread 5A on battery cap 5, Battery 1 B1, battery 2 B2 and battery 3 B3 are connected in series providing circuit C 4.5 Volts to operate red LED lamp 15. The design could include a different plurality of batteries, ranging from 2 to 4 AA batteries. However combining three AA batteries and therefore supplying 4.5 volts to circuit C is a good choice as it is both electrically efficient and cost-effective for many of the circuits designed to energize LED lamps. Typical circuit arrangements can be designed such that red LED lamp 15 and therefore red light LR would emit light having either a flashing or a steady mode. It is also possible to include a switch to change between steady and flashing modes. FIG. 8 describes red light assembly AR employing red LED lamp 15 emitting orange light in a steady mode for reasons to be later described. It would be easy to substitute any of the many available colors of LED lamps including infrared, white, green, yellow, amber, red or blue for red LED lamp 15, thereby creating a light emitting any of the available LED colors including infrared.

Landing zone kit 20 as shown in FIG. 1 incorporates four red lights LR, each emitting a light of a common red color and one yellow light LY. This is a preferred color combination for reasons to be later described. Other color combinations can be used and still employ many of the concepts of the present invention. It is also possible to provide a landing zone kit where all of the lights are of a single color while still taking advantage of some of the improvements disclosed in this application.

Figure 11:
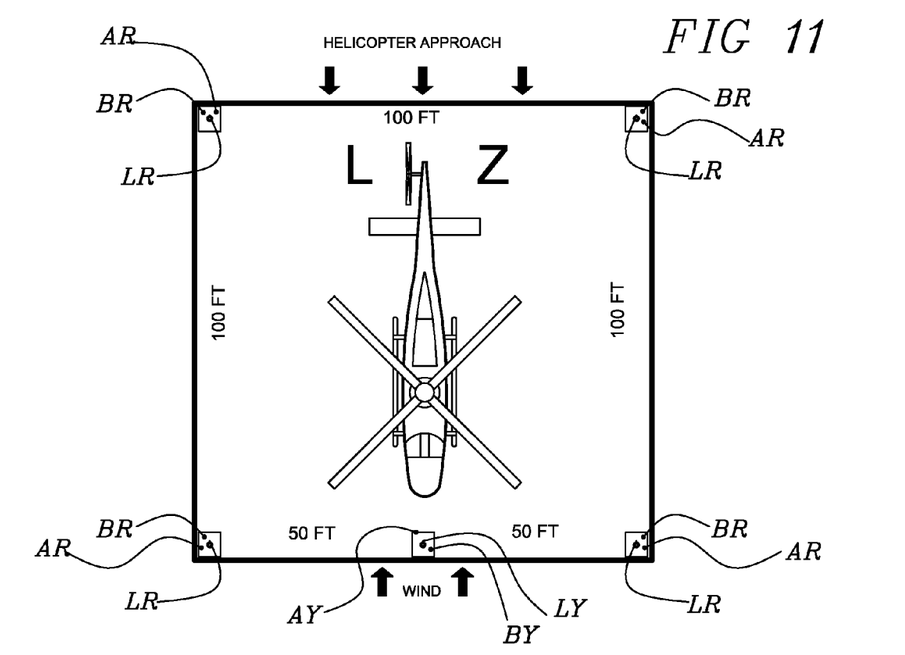
FIG. 11 is a top view of a typical landing zone

FIG. 11 is a top view of a typical landing zone LZ and details the appropriate locations for the light assemblies of landing zone kit 20 to identify the landing zone. In FIG. 11 four red LED light assemblies AR, including red light LR typically emitting steady light beams are placed at the corners of a rectangle with 100 foot sides in order to define the perimeter including the corners of the landing zone. A single yellow light assembly AY including yellow light LY is placed midway on one of the sides of the landing zone. The yellow light LY has a pulsing mode to differentiate it from the perimeter lights which emit a steady mode light beam. Placing four LED corner lights having a first color to identify the perimeter of the landing zone and a single additional LED light of a blue color to identify the wind direction is prior art. However, landing zone kits using a blue LED wind direction light present a problem created by night vision goggle technology.

Many civilian and military pilots are now using night vision goggles during nighttime landings. Many of these goggles have special light restricting class A filters which substantially attenuate light at wavelengths of 625 nm and below. Therefore, pilots using night vision goggles, which incorporate class A filters, cannot see LED wind direction or perimeter landing zone lights which do not emit light having adequate energy near or greater than 625 nm.

Other available night vision goggles have special light restricting class B filters which substantially attenuate light at wavelengths of 665 nm and below. Therefore, pilots using night vision goggles, which incorporate class B filters, cannot see LED wind direction or perimeter landing zone lights which do not emit light having adequate energy near or greater than 665 nm.

Depending upon the type of light source, intensity, color of light emitted and the exact type of filter on the night vision goggles it is very possible that the pilot would not see blue or green LED lights. In general blue lights emit energy with peak wavelengths of approximately 490 nm. If the lights are LED lights the bandwidth of emitted light is small with very little energy emitted outside a 75 nm bandwidth about the peak wavelength. Therefore blue LED lights emit (radiate) virtually no energy above 525 nm, Blue LED lights—because of the wavelengths of emitted light—can be impossible to see when using A or B filtered night vision goggles. Green LED landing zone lights similarly do not emit enough energy near or greater than the wavelengths necessary to be seen by pilots employing night vision goggles with class A or class B filters.

The present invention in offering both perimeter and wind direction LED lights emitting visible light having peak wavelengths greater than 588 nm (this represents lights emitting light in the visible yellow-amber-orange-red range) assures (assuming that the intensity, beam pattern and other parameters are acceptable) that both the landing zone perimeter and wind direction lights are emitting enough energy near the 625 nm wavelength to make them visible to pilots employing night vision goggles having class A filters as well as to pilots flying with the naked eye. Although yellow lights emit (radiate) light at peak wavelengths of approximately 588-590 nm, which is substantially below the 625 nm wavelength of class A filters, they can still be visible with A filtered goggles due to the fact that the emitted light has a bandwidth effecting some light emitted (radiated) near the 625 nm wavelength. In addition, the night vision goggles magnify the light substantially so even a small amount of light can often be seen. An LED light source emitting light of a yellow color having a peak wavelength of 588 nm will—due to its bandwidth—generally emit over forty percent of its emitted (radiated) light between 588 and 740 nm. This portion of the emitted light includes the small amount of energy necessary to achieve visibility using a night vision goggle with a class A filter.

Additionally the present invention in optionally offering both perimeter and wind direction LED lights emitting visible light having peak wavelengths greater than 631 nm (this represents lights emitting light in the visible orange-red range) assures (assuming that the intensity, beam pattern and other parameters are acceptable) that both the landing zone perimeter and wind direction lights are emitting enough energy near or greater than the 665 nm wavelength to make them visible to pilots employing night vision goggles having class B filters as well as to pilots flying with the naked eye. Lights visible to pilots employing night vision goggles with class B filters are also visible to pilots employing night vision goggles with class A filters. Although red-orange lights emit (radiate) light at peak wavelengths of about 631 nm, which is substantially below the 665 nm wavelength of class B filters, they can still be visible with B filtered goggles due to the fact that the emitted light has a bandwidth representing light radiated near the 665 nm wavelength. In addition, the night vision goggles magnify the light substantially so even a small amount of light can often be observed. An LED light source emitting light of an red-orange color having a peak wavelength of 631 nm will—due to its bandwidth—generally emit over forty percent of its emitted (radiated) light between 631 and 740 nm. This portion of the emitted light includes the small amount of energy necessary to achieve visibility using a night vision goggle with a class B filter.

LED landing zone lighting devices emitting white light can also be acceptably visible to pilots using night vision goggles having either class A or class B filters. This results in the fact that white light is a combination of colors including red, blue and green. Although the blue and the green portions of emitted light are not visible to the night vision goggles the red component of the white light is visible. Therefore in the present invention LED lights emitting white light can usually be acceptably seen by pilots using night vision goggles with class A or class B filters.

Other light sources such as xenon and incandescent do not have the blue light problem of night vision goggle visibility found in LED light sources. This results from the fact that these other light sources emit substantial amounts of infrared energy above 740 nm which is not visible to the naked eye but very visible to night vision goggles. Unfortunately, they present a new problem in that the excessive amounts of infrared energy they emit can overwhelm the night vision goggles. These light sources—in order to create enough visible energy to be adequately seen by the naked eye—create an unacceptably large amount of infrared energy when viewed using night vision goggles.

Night vision goggles permit pilots to see at night, however the goggles cannot easily differentiate between colors. Therefore, in the present invention the beam emerging from the perimeter lights is steady and the beam emerging from the wind direction light is pulsing. Hence pilots landing using filtered night vision goggles and seeking to land at a location identified by landing zone kit 20 will—due to their wavelengths—see all five lights. They will know the perimeter because the perimeter lights are steady. They will know the wind direction because the pulsing light indicates wind direction. The wind direction light of the present invention pulses from a high to a low intensity. This is superior to a landing zone light which flashes from "on" to "off" as the pulsing design provides continuous and unbroken communication to the pilot regarding the wind direction.

Figure 12:
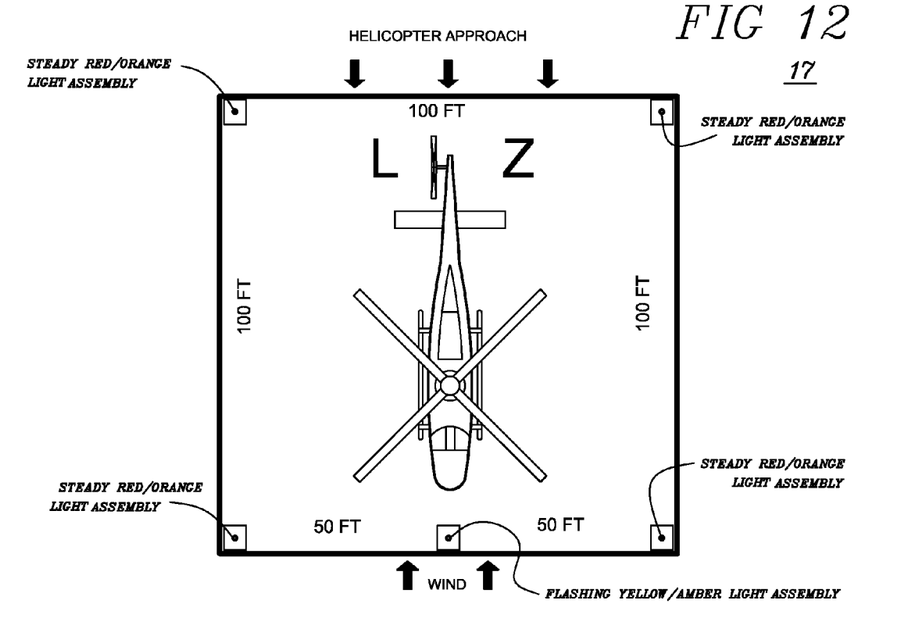
FIG. 12 is a landing zone indicator

FIG. 12 is a laminated card landing zone indicator 17 provided with landing zone kit 20 detailing the deployment locations for the light assemblies in landing zone kit 20 necessary to identify a typical landing zone. In FIG. 12 four red LED light assemblies typically emitting steady light beams are placed at the corners of a rectangle with 100 foot sides in order to define the perimeter (also the corners) of the landing zone. A single yellow light assembly is placed midway on one of the sides of the landing zone to identify the wind direction. The LED yellow light is pulsing to differentiate the wind direction light from the perimeter lights which have a steady light beam.

Helicopters often have powerful searchlights. Prior art has used reflective tape on lights and the military has use reflectorized fabric that is unrolled, placed on the ground and weighed down by local rocks. The present invention places reflective tape on rigid weighted bases having smooth surfaces. The present invention is superior to the military reflectorized fabric concept because the rigid weighted bases do not wrinkle and fold the reflective tape, thereby reducing its effectiveness. Reflective tape is known to primarily return light directly back at the source. Therefore if the tape is wrinkled or bent—as happens on a fabric—it redirects the impinging light to places other than the cockpit of the helicopter. This is inferior to the design of the present invention which provides a rigid flat surface (weighted base) for the reflectorized tape as disclosed in FIG. 6.

As the helicopter lands it pushes the air down which eventually flows outward tending to overturn the lighting assemblies employed in any landing zone kit. Therefore the lighting assemblies of any kit must be designed to minimize wind resistance and to therefore minimize the forces produced by the rotor wash (moving air) such that the rotor wash does not overturn them.

Finally, if the rotor wash does rotate a light assembly placing its weighted base on its edge it is important that the weighted base have a noncircular or irregular perimeter such as a rectangular perimeter because a circular perimeter would permit the weighted base to stand on its perimeter and roll possibly displacing it from a safe to a dangerous location. Landing zones are often required to be set up in grassy areas. Therefore, it is desirable that a light assembly employed in a landing zone be taller than surrounding grass. In this regard our testing has indicated that a light exceeding 7 inches tall is adequate to overcome grass type obstructions typically found in parks and ball fields, which are typically used as landing zones. Unfortunately, a tall light encourages rotor wash overturning the light assembly. Hence, tall lights are not used in many kits. The negative effect of the tall light can be countered by aiding weight to the lighting assembly. However, this is not always an acceptable solution because adding weight to the light assembly and consequently the landing zone kit is often not desirable from a transportation point of view. The concepts provided in this application, including the preferred embodiment of this invention provide a solution. The preferred embodiment solves this problem by powering the light with three AA batteries axially aligned along a common axis and along a vertical to provide beneficial height for the light. The AA batteries have a small diameter relative to the C or D cells employed in prior art permitting the housing of the light to have a relatively small nominal diameter thereby substantially reducing the wind resistance over prior art which employed C or D cells axially aligned along a vertical. The present embodiment in using three AA batteries axially aligned provides a landing zone light which is tall enough to extend above normal grass level. Yet—due to its small nominal diameter—it has a reduced horizontal projected area and therefore creates minimal wind resistance deterring rotor wash from overturning the light assembly. Additionally, from an electronics perspective the 4.5 Volt three AA battery design is extremely efficient thereby increasing the battery life and making the overall design an excellent landing zone light. Finally, employing lithium class AA batteries in place of heavier alkaline AA batteries further improves the design by shifting the center of gravity of the light\base assembly towards the ground, thereby increasing the stability of the assembly.

When colored lights and colored bases are employed as assemblies it is desirable to match the color of the emitted light with the color of the related weighted base so as to avoid confusing pilots during landings in which both lights and bases are visible. In order to match the colors of lights and bases in the present application the color emitted from each light and the color of its related base are only required to be similar to the extent that the intended pairing of lights and bases is obvious. For example, fluorescent red/orange bases can be matched to related lights that emit red light and yellow bases can be matched to related lights that emit yellow/amber light.

We have found in our evaluations that in order to be visible, weighted bases which may be used for daytime landings should provide a projected surface area of a fluorescent bold color of at least forty square inches. They should also weigh at least 2 pounds to provide desired stability. Red base BA of FIG. 6 has a projected surface area of approximately eighty-one square inches and a weight of 3 pounds. Projected surface area is defined as the area as viewed from directly above the deployed weighted base, Whenever possible it is desirable to exceed the minimum projected surface area requirements. However, large weighted bases are avoided because they contradict the needs of many emergency vehicles which require compact equipment.

Referring back to FIG. 1 it can be seen that rectangular red base BR fits compactly and snugly into rectangular carrying case CA. Thus, the rectangular perimeter of red base BR not only serves to prevent it from standing on its side and rolling to a new location as a result of rotor wash winds it also permits compact storage and easy transportation of all of the bases by employing a rectangular carrying case for landing zone kit 20.

Looking back at FIGS. 6, 7 and 8 it can be seen that red light LR is attached to related red base BR by means of magnet 11 at the base of red light LR. This design is unique because if rotor wash does increase wind pressure to the extent that it pushes red light LR with excessive horizontal force red light LR will slide in depression 9, contact the edge of depression 9 and then fall down. This is preferred rather than the light being permanently attached to and continuously holding onto the base as it is pushed by the rotor wash. If the light remains attached to the base during extreme rotor wash pressure the base will rotate upward into the rotor wash where the base can be moved by the wind to an undesirable location. In the preferred embodiment of the present invention although red light LR will—after falling down—be lying flat on the weighted base, it is not easily blown to an undesirable location because magnet 11 maintains an attraction to red base BR keeping the light—which now is lying flat with very low wind resistance—connected to red base BR by magnetic forces.

Helicopter landings take place during the bright sunlight as well as during dark nighttime.

Although daytime provides improved visibility for the helicopter pilot it is still desirable to have the landing zone identified to avoid confusion and potential accidents. Battery-powered lights capable of meeting the size and cost requirements for a landing zone kit provide poor visibility during bright sunlight. Poor visibility kits are not useful during bright sunlight landings. The present invention in using large fluorescent bases having large projected surface areas solves the problem as the large fluorescent bases are highly visible even in the bright sunlight. Since the lights are removably attachable to the bases and the fluorescent bases are very visible in bright sun light landing zones can be identified during daylight and bright sunlight with the bases alone. Normally the weighted bases are fluorescent orange or yellow as those colors make the bases stand out from many natural green grass backgrounds. However, there are natural backgrounds such as deserts for which fluorescent green or white bases would be acceptable. During nighttime operations the lights can be attached to the bases thereby providing the illumination necessary for nighttime landings.

Red light LR and yellow light LY are identical except for the circuit and the color of the LED lamp. Therefore, discussions related to the construction of one of those lights would usually apply to the other. And, as indicated previously, light sources other than LED light sources such as xenon or incandescent light sources emit large amounts of their energy in the infrared zone. This infrared light represents wavelengths above 740 nm. It is not visible to the naked eye but highly visible to pilots employing night vision goggles. Therefore, although these other light sources do not have the problem which makes blue or green LED lights hard to locate with night vision goggles they have a serious problem caused by the extreme amounts of infrared energy they emit. Infrared energy which overwhelms night vision goggles even when the lights are filtered to emit blue and green light. As these other light sources are adjusted to emit sufficient visible energy to be seen by pilots flying with the unaided eye they also emit excessive infrared energy which overwhelms night vision goggles causing the night vision goggles to malfunction. This deficiency can be controlled if the other light sources (xenon and incandescent) are filtered such that at least 75 percent of their emitted radiated energy is light between 588 nm and 740 nm making it visible to night vision goggles and to the unaided eye.

Throughout the prior discussion of the preferred embodiment of the present invention yellow light LY and yellow base BY were disclosed as indicating wind direction. It is noteworthy to realize that in place of yellow light LY a white light could be employed. Also in place of yellow base BY a white base could be employed. Substituting white lights and bases for yellow lights and bases in the kit is advantageous because it permits the kit to function with night vision goggles having either class A or class B filters.

Throughout the prior discussion of the preferred embodiment of the present invention yellow was the color employed indicating wind erection and red the color employed indicating perimeter lights. It is noteworthy to realize that the selection of wind direction and perimeter lighting colors is optional as long as the colors selected comply with the wavelengths disclosed within this application. For example the perimeter lighting color could be white and the wind direction color could be red.

The foregoing disclosing the description of the invention are illustrative and explanatory thereof and various changes to size, shape, material, components and order may be made without departing from the spirit of the invention.

I claim:

1. A carriable portable visual aid for landing helicopters comprising a kit having:
   a plurality of at least four first color bases of a first bold base color, each first color base having a first color LED light comprising a housing above the base and of a first light housing color, the first light housing color matched with said first bold base color as a first color group, the housing for supporting a first light source above the base emitting a first emitted light of a first emitted color matched with said first bold base color, each first color base having a projected surface area of at least forty square inches for daytime visibility and being of a weight for preventing displacement due to helicopter rotor wash; and a second color base of a second bold color having a second color LED light, the second light comprising a second housing above the second color base and of a second light housing color, the second light housing color matched with said second bold base color as a second color group, the second housing for supporting a second light source above the second color base emitting a second emitted light of a second emitted color matched with said second bold color, the second color base having a projected surface area of at least forty square inches for daytime visibility and being of a weight for preventing displacement due to helicopter rotor wash, the second light housing color, the second emitted color and said second bold base color of the second color group different than the first color group, whereby during daytime, dusk and nighttime said kit is employable to define a perimeter of a landing zone with the first color group and a wind direction with the second color group, wherein each of said plurality of first color LED lights is configured to emit a steady light; and said second color LED light is configured to emit a pulsing light.

2. The carriable portable visual aid for landing helicopters according to claim 1, wherein said first color group is selected from the group consisting of a red color, an orange color, and a yellow color, and said second color group is selected from the group consisting of a red color, an orange color, and a yellow color.

3. The carriable portable visual aid for landing helicopters according to claim 1, wherein each first color base has a weight greater than the first color LED light to improve stability of the assembled first color base and first color LED light.

4. The carriable portable visual aid for landing helicopters according to claim 1, wherein each said first color LED light comprises a single LED light source and an optic for concentrating the first emitted light from the LED light source about a horizontal direction.

5. The carriable portable visual aid for landing helicopters according to claim 1, wherein each of said at least four first color bases comprises steel, and each of the first light housings comprises a magnet for attachment of a first color LED light to a first color base and for holding the first color LED light such that an axis of the first color LED light is directed in a vertical direction.

6. The carriable portable visual aid for landing helicopters according to claim 1, wherein each base of said at least four first color bases and said second color base is rigid with a rectangular perimeter; and said at least four first color bases and said second color base are configured for storage within a substantially rectangular carrying case at a location separate from a storage location of the first lights and the second light.

7. The carriable portable visual aid for landing helicopters according to claim 1, further comprising:

an indicator identifying a disposition of each base of said at least four first color bases on a corner of a square for defining the perimeter of said landing zone with the first bold color and a disposition of said second color base on a side of the square between the corners for defining the wind direction with the second bold color.

8. The carriable portable visual aid for landing helicopters according to claim 1, wherein each base of said at least four first color bases comprises steel.

9. A carriable portable visual aid for landing helicopters comprising:

a kit comprising a plurality of at least four bases, each base of said at least four bases of a first common bold color and having a removably attachable light, each said removeably attachable light comprising a first housing of a first light housing color above said base supporting and LED lamp above said base, the first light housing color and the first common bold color matched as a first color group, said LED lamp for emitting an emitted light of a first emitted color, the first emitted color matched with the first common bold color and the light housing color, the emitted light concentrated by a lens approximately along a horizontal direction or tilted slightly upward, wherein each base has a weight for preventing displacement due to helicopter rotor wash and a projected surface area of at least forty square inches for daytime visibility, whereby said at least four bases with the corresponding removably attachable light are employable to define a perimeter of a landing zone with said first color group for daytime, dusk or nighttime landings, and each said base weighs at least 2 pounds and is less than ½ inch tall.

10. The carriable portable visual aid for landing helicopters according to claim 9, wherein each removably attachable light has a nominal housing diameter less than 1.125 inches.

11. The carriable portable visual aid for landing helicopters according to claim 9, wherein each base has a weight greater than a removably attachable light to improve the stability of the assembled base and removably attachable light.

12. The carriable portable visual aid for landing helicopters according to claim 9, further comprising:

a wind direction base of a second bold color different than said first common bold color, wherein said wind direction base has a weight for preventing displacement due to helicopter rotor wash and has a minimum projected surface area of forty square inches for daytime visibility, said wind direction base has a removably attachable wind direction light comprising a second housing of a second color above said wind direction base supporting a wind direction LED lamp above said wind direction base, the second color and the second bold color matched as a second color group, and said wind direction LED lamp is configured for emitting an emitted light of a wind direction emitted color matched with said second color and said second bold color and configured to be concentrated by a lens approximately along a horizontal direction or tilted slightly upward whereby the wind direction is identified by said second color group for daytime, dusk or nighttime landings.

13. The carriable portable visual aid for landing helicopters according to claim 9, further comprising
a wind direction base of a second bold color different than said first common bold color, wherein
said wind direction base has a weight for preventing displacement due to helicopter rotor wash and having a minimum projected surface area of forty square inches for daytime visibility,
said wind direction base has a removably attachable wind direction light comprising a second housing of a second color above said wind direction base for supporting a wind direction LED lamp above said wind direction base, the second color and the second bold color matched as a second color group, and
said wind direction LED lamp is configured for emitting a pulsing wind direction emitted light of a wind direction emitted color matched with said second color and said second bold color and configured to be concentrated by a lens approximately along a horizontal direction or tilted slightly upward whereby the wind direction is continuously identified with said second color group for daytime, dusk or nighttime landings.

14. The carriable portable visual aid for landing helicopters according to claim 9, wherein
each of said at least four first color bases comprises steel, and
each of the first housings comprises a magnet for attachment of the removably attachable light to the base and for holding the removably attachable light such that an axis of the light is directed in along a vertical direction.

15. The carriable portable visual aid for landing helicopters according to claim 9, further comprising a yellow wind direction base having a removably attachable yellow wind direction light comprising a second housing above the wind direction base for identifying wind direction with a yellow color, wherein the bold color is a red or orange.

16. A carriable portable visual aid for landing helicopters comprising:
a plurality of at least four lights each having a first housing of a first light housing color of a first color group, each of said plurality of at least four lights having an LED energized by a plurality of AA batteries disposed in the housing on an axis and configured for emitting a light of a first emitted light color concentrated by a dedicated optic about a horizontal direction,
each of said plurality of at least four lights having a base configured to be removably attachable to the light below the light, each base having a first bold color matched with the first emitted light color and the first light housing color,
each base, of a weight for preventing displacement due to helicopter rotor wash, of a size for a minimum projected surface area of forty square inches for daytime visibility and of the weight and the size for compact storage in a carriable case whereby said visual aid is carriable in the case and employable to define a perimeter of a landing zone with the first color group for daytime, dusk or nighttime landings,
wherein each said base weighs at least 2 pounds and is less than ½ inch tall.

17. The carriable portable visual aid for landing helicopters according to claim 16, wherein said plurality of AA batteries comprises three AA batteries.

18. The carriable portable visual aid for landing helicopters according to claim 16, wherein
each light of said at least four lights comprises three AA lithium batteries for a reduction in a weight of said light and a shifting of a center of gravity of said light towards the base.

19. The carriable portable visual aid for landing helicopters according to claim 16, wherein
said first bold color is of said first color group whereby the perimeter is identifiable by the first bold color.

20. The carriable portable visual aid for landing helicopters according to claim 16, wherein
each light of said plurality of lights has a nominal first housing diameter less than 1.125 inches.

21. The carriable portable visual aid for landing helicopters according to claim 16, further comprising:
a wind direction light having a second housing of a second light housing color of a second color group, said wind direction light having a wind direction LED light source energized by a plurality of AA batteries disposed on an axis, said wind direction LED light source configured for emitting a light of a second emitted light color concentrated by an optic about the horizontal direction,
said wind direction light being removably attachable to a wind direction base,
said wind direction base having a second bold color of the second color group and matched with the second emitted color and the first light housing color,
said wind direction base of a weight for preventing displacement due to helicopter rotor wash, of a size of a projected surface area of a minimum of forty square inches for daytime visibility and of a weight and size for compact storage in the case whereby said visual aid is carriable in the case, employable to define a perimeter of a landing zone with the first bold color and the wind direction with the second color group for daytime, dusk or nighttime landings.

22. A carriable portable visual aid for landing helicopters comprising:
a plurality of first color LED lights for defining the perimeter of a helicopter landing zone, each LED light of the plurality of first color LED lights configured to emit a first color light visible to a naked eye of a flying pilot and having a peak wavelength greater than 588 nm; and
a second color LED light for indicating wind direction, configured to emit a second color light, said second color light visible as different from the first color light to the naked eye of the flying pilot, said second color light having a peak wavelength greater than 588 nm, whereby said plurality of first color LED lights and said second color light are visible as different colors when viewed through the naked eye and also visible through night vision goggles having class A filters, wherein
each of said plurality of first color LED lights are removably attachable to a first base, each first base having a first bold color matched with said first color, each first base being configured for placement on a horizontal surface and for holding the first color LED light and having a weight for preventing displacement during helicopter rotor wash, and
said second color LED light is removably attachable to a second base, said second base having a second bold color matched with said second color, said second base being configured for placement on the horizontal surface and for holding said second color LED light and having a weight for preventing displacement during helicopter rotor wash.

23. A carriable portable visual aid for landing helicopters comprising:
  a plurality of first color LED lights for defining the perimeter of a helicopter landing zone, each LED light of the plurality of first color LED lights configured to emit a first color light visible to a naked eye of a flying pilot and having a peak wavelength greater than 588 nm; and
  a second color LED light for indicating wind direction, configured to emit a second color light said second color light visible as different from the first color light to the naked eye of the flying pilot said second color light having a peak wavelength greater than 588 nm. whereby said plurality of first color LED lights and said second color light are visible as different colors when viewed through the naked eye and also visible through night vision goggles having class A filters, wherein
  each light of said plurality of first color LED lights and said second color LED light have a nominal housing diameter less than 1.125 inches.

24. A carriable portable visual aid for landing helicopters comprising:
  a plurality of first color LED lights for defining the perimeter of a helicopter landing zone, each LED light of the plurality of first color LED lights configured to emit a first color light visible to a naked eye of a flying pilot and having a peak wavelength greater than 588 nm; and
  a second color LED light for indicating wind direction, configured to emit a second color light said second color light visible as different from the first color light to the naked eye of the flying pilot said second color light having a peak wavelength greater than 588 nm, whereby said plurality of first color LED lights and said second color light are visible as different colors when viewed through the naked eye and also visible through night vision goggles having class A filters, wherein
  said plurality of first color LED lights are each configured to emit a steady light; and said second color LED light is configured to emit a pulsing light.

25. A carriable portable visual aid for landing helicopters comprising:
  a plurality of first color LED lights for defining the perimeter of a helicopter landing zone, each LED light of the plurality of first color LED lights configured to emit a first color light visible to a naked eye of a flying pilot and having a peak wavelength greater than 588 nm; and
  a second color LED light for indicating wind direction, configured to emit a second color light said second color light visible as different from the first color light to the naked eye of the flying pilot said second color light having a peak wavelength greater than 588 nm, whereby said plurality of first color LED lights and said second color light are visible as different colors when viewed through the naked eye and also visible through night vision goggles having class A filters, wherein
  each LED light of said plurality of first color LED lights have at least a forty square inch projected surface area weighted first base of a first fluorescent color substantially the same as said first color LED lights for pairing with said first color LED lights, said first base being of a weight for preventing displacement during helicopter rotor wash; and
  said second color LED light has at least a forty square inch projected surface area weighted second base of a second fluorescent color substantially the same as said second color LED light for pairing with said second color LED light, said second base being of a weight for preventing displacement during helicopter rotor wash.

26. A portable visual aid for landing helicopters comprising:
  a plurality of first color LED lights for defining the perimeter of a helicopter landing zone, each LED light of the plurality of first color LED lights for emitting a common first color light visible to a naked eye and having a peak wavelength greater than 631 nm, each LED light of the plurality of first color LED lights having a first bold color base being of a weight for preventing displacement due to helicopter rotor wash; and
  a second color LED light for indicating wind direction, for emitting a second color light different in color than said common first color light, visible to the naked eye and having a peak wavelength greater than 631 nm, said second color LED light having a second bold color base being of a weight for preventing displacement due to helicopter rotor wash whereby said plurality of said first color LED lights and said second color LED light are visible through night vision goggles having class B filters and said common first color light and said second color light are visible to the naked eye of a flying pilot.

27. The portable visual aid for landing helicopters according to claim 26, wherein
  all of said plurality of first color LED lights are configured to emit a first selection of a pulsing light, a flashing light or a steady light,
  said second color LED light is configured to emit a second selection of either a pulsing light, a flashing light or a steady light, said first selection being different than said second selection; and
  the portable visual aid further comprises a landing zone indicator detailing a deployment location of said first selection of said plurality of first color LED lights, said landing zone indicator also detailing the deployment location of said second selection of said second color LED light.

28. A portable visual aid for landing helicopters comprising:
  a plurality of at least four LED lights, each of said plurality of at least four LED lights for emitting a steady light; and
  a second LED light for emitting a second light of a pulsing light whereby said plurality of at least four LED lights are continuously visible to continuously indicate a perimeter of a landing zone and said second LED light is continuously visible to continuously indicate a wind direction,
  each of said plurality of at least four LED lights is configured to emit a first emitted light of a first color,
  said second light is configured to emit a second emitted light of a second color,
  said first emitted light and said second emitted light have approximately forty percent of their emitted radiant energy within a range of 631 nm to 740 nm,
  said first emitted light and said second emitted light are visible to flying pilots using night vision goggles employing class B filters and said first color and said second color are visible as distinct colors to an unaided eye.

29. The portable visual aid for landing helicopters according to claim 28, wherein
  each LED light of said plurality of at least four LED lights includes a first base of a first bold color and of a weight for preventing displacement due to helicopter rotor wash, each said first base having a minimum projected surface area of forty square inches; and said second LED light includes a second base of a second bold color and of a weight for preventing displacement due to helicopter rotor wash, said second base having a minimum projected surface area of forty square inches.

30. The portable visual aid for landing helicopters according to claim 28, further comprising:

a landing zone indicator detailing a deployment location of said plurality of at least four LED lights, said landing zone indicator also detailing a deployment location of said second LED light whereby the perimeter is continuously identified with steady lights and the wind direction is continuously identified with a pulsing light.

31. A portable visual aid for landing helicopters comprising:

a plurality of at least three first color LED lights, each LED light of the plurality of at least three first color LED lights for emitting a first light of a common first color, each said first color LED light of the at least three first color LED lights having a first bold color base being of a projected surface area of at least forty square inches for daytime visibility and being of a weight for preventing displacement due to helicopter rotor wash and a second color LED light for emitting a second light of a second color different in color than said common first color, said second color LED light having a second bold color base being of a projected surface area of at least forty square inches for daytime visibility and being of a weight for preventing displacement due to helicopter rotor wash; and each LED light of said plurality of at least three first color LED lights and said second light having at least seventy five percent of radiated energy between 588 nm and 740 nm whereby said plurality of first color LED lights are employable to define a perimeter of a landing zone and said second color light is employable to define a wind direction.

32. A portable visual aid for landing helicopters comprising:

a plurality of at least three first color LED lights, each LED light of said plurality of first color LED lights for emitting light of a common first color and having at least two axially aligned AA batteries supported by a noncircular base, each of said bases having a projected surface area of at least forty square inches and of a first bold base color coordinated with said first color and substantially the same as said common first color for pairing with said common first color;

a second color LED light having at least two axially aligned AA batteries for emitting light of a second color different than said common first color, supported by a noncircular base having a projected surface area of at least forty square inches and of a second bold base color coordinated with said second color and substantially the same as said second color for pairing with said second color; and said common first color having a peak wavelength between 588 nm and 740 nm and said second color having a peak wavelength between 588 nm and 740 nm whereby said plurality of at least three first color LED lights are employable to define a perimeter of a landing zone and said second color LED light is employable to define a wind direction.

* * * * *